United States Patent [19]

Welsch et al.

[11] Patent Number: 5,293,573
[45] Date of Patent: Mar. 8, 1994

[54] STRIPLINE LASER INCLUDING ELECTRICALLY CONDUCTING MIRROR

[75] Inventors: Wolfgang Welsch, Baldham; Hans Krueger, Munich, both of Fed. Rep. of Germany

[73] Assignee: Siemens Aktiengesellschaft, Munich, Fed. Rep. of Germany

[21] Appl. No.: 950,061

[22] Filed: Sep. 23, 1992

[30] Foreign Application Priority Data

Sep. 23, 1991 [DE] Fed. Rep. of Germany ....... 4131623

[51] Int. Cl.⁵ ............................................. H01S 3/097
[52] U.S. Cl. ......................................... 372/82; 372/76; 372/87; 372/99; 372/107
[58] Field of Search ................. 372/38, 61, 76, 82, 372/87, 88, 106, 107, 99

[56] References Cited

U.S. PATENT DOCUMENTS

| | | | |
|---|---|---|---|
| 4,631,732 | 12/1986 | Christensen | 372/87 |
| 4,817,107 | 3/1989 | Hsia | 372/61 |
| 4,875,220 | 10/1989 | Krueger et al. | 372/61 |
| 4,890,294 | 12/1989 | Nishimae et al. | 372/61 X |
| 5,088,102 | 2/1992 | Krueger et al. | 372/87 X |
| 5,127,017 | 6/1992 | Krueger et al. | 372/61 |
| 5,197,079 | 3/1993 | Krueger et al. | 372/87 |
| 5,220,576 | 6/1993 | Krueger et al. | 372/87 |
| 5,224,117 | 6/1993 | Krüger et al. | 372/82 |

FOREIGN PATENT DOCUMENTS

| | | | |
|---|---|---|---|
| 0451483 | 2/1991 | European Pat. Off. | 372/61 X |
| 0523674 | 1/1993 | European Pat. Off. | 372/61 X |
| 4010147 | 10/1991 | Fed. Rep. of Germany | 372/61 X |

Primary Examiner—Brian Healy
Attorney, Agent, or Firm—Hill, Steadman & Simpson

[57] ABSTRACT

A stripline laser wherein the distance between a mirror and a stripline is minimized without modifying the characteristics of the laser is provided. The stripline laser prevents damaging of the mirror due to plasma discharge by providing at least two insulating strips arranged between oppositely polarized electrodes. Electrically conductive paths lie between the insulating strips. The insulating strips are arranged to guarantee a voltage division. The voltage division maintains the voltage of the electrically conductive path neighboring the mirror below a plasma-maintaining voltage.

17 Claims, 1 Drawing Sheet

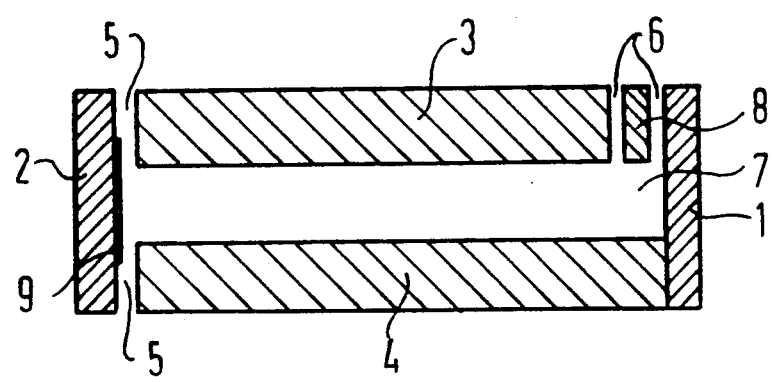

STRIPLINE LASER INCLUDING ELECTRICALLY CONDUCTING MIRROR

FIELD OF THE INVENTION

The present invention relates generally to a stripline, or gas discharge, laser in which mirrors adjoin a stripline, and an insulating path is arranged between at least one electrode and an electrically-conductive mirror.

BACKGROUND OF THE INVENTION

A known stripline laser having mirrors adjoining a stripline and an insulating path arranged between at least one electrode and electrically-conductive mirror is discussed in German Patent Application P 40 10 147.9. One limitation in constructing such a known stripline laser is the placement of the mirror with respect to the stripline end. For example, as the distance between the mirror and the stripline end increases, output losses of the laser rapidly increase. Further, decreasing the spacing between the mirror and the stripline end increases the risk that the discharge of the plasma will arc toward the mirror and damage the mirror.

SUMMARY OF THE INVENTION

It is an object of the present invention to provide a stripline laser wherein the spacing between the mirror and the stripline end is reduced and where a discharge of the plasma onto the mirror is avoided without modifying the characteristics of the laser.

The above object is inventively achieved in a stripline laser including first and second oppositely polarized electrodes. An electrically conductive mirror is provided, and adjoins a stripline. A voltage division arrangement includes at least two insulating paths arranged between the oppositely polarized electrodes. The voltage division arrangement is disposed near the electrically conductive mirror. The voltage division arrangement maintains a voltage along electrically conductive paths, disposed between the insulating paths, below a plasma-maintaining voltage by suitably arranging the insulating paths.

During high-frequency operation, an electrically conductive material arranged between two insulating paths adjusts to a voltage potential. The voltage potential is defined by the resistance in and along the insulating paths, as well as the capacitances across the insulating paths. The resistance and capacitance can be defined by connecting appropriate components, or by introducing appropriate resistance layers between the mirror and the oppositely polarized electrodes. However, in general, an appropriate dimensioning of the gap widths of the insulating paths is sufficient to achieve the desired voltage division.

Advantageously, the mirror is separated from the oppositely polarized electrodes by insulating strips, and the electrical capacitances are set such that the potential of the mirror lies at approximately one-half the voltage between the oppositely polarized electrodes. Such an arrangement produces a symmetrical stripline laser having particularly narrow insulating strips. The laser is further optimized by providing spacings having an identical width between the mirror and the oppositely polarized electrodes, wherein the insulating strips are formed of dielectrics having the same dielectric constant.

In one embodiment of a stripline laser constructed in accordance with the principles of the present invention, the first oppositely polarized electrodes is directly connected to the electrically conductive mirror. The second oppositely polarized electrode is separated from the mirror by a spacing. An auxiliary electrode is disposed substantially centrally in the spacing. The auxiliary electrode lies at a potential below that of the mirror and below that of the first oppositely polarized electrode connected to the mirror.

In another embodiment, the insulating strips are formed by gaps. The gaps can be filled with an insulator, such as ceramic. Advantageously, the mirror can be coated with plasma-stable layers, which prevent destruction of the mirror caused by radiation from the plasma or by ions from the plasma, which are unavoidable given high intensities.

Other advantages and features of the invention will be readily apparent from the following description of the preferred embodiments, the drawings and claims.

BRIEF DESCRIPTION OF THE DRAWINGS

The FIGURE illustrates a sectional view of a stripline laser constructed in accordance with the principles of the present invention.

DETAILED DESCRIPTION

As illustrated in the FIGURE, mirrors 1, 2 are separated from electrodes 3, 4 by insulating gaps 5, 6. The insulating gaps 5 guarantee that the mirror 2 has a potential below the plasma-maintaining potential, as compared to the electrodes 3, 4. The electrodes 3, 4 are oppositely polarized. Advantageously, the insulating gaps 5 are of uniform width, such that the potential of the mirror 2 adjusts to the median of the potentials of the electrodes 3, 4. Additionally, the mirror 2 can be protected by a plasma-stable layer 9, such that destruction of the mirror caused by radiation from the plasma generated in a discharge gap 7 is prevented. Further, the plasma-stable layer 9 prevents destruction of the mirror 2, due to ions from the plasma.

Advantageously, the mirror 1 is directly connected to the electrode 4. Preferably, the electrode 4 is grounded. The electrode 3 is separated from the mirror 1 by insulating gaps 6. An auxiliary electrode 8 is disposed between the insulating gaps 6, and forms an electrically conductive path. By arranging the auxiliary electrode 8 between the insulating gap 6, an arc-over of the plasma onto the mirror 1 is prevented, as the plasma-maintaining voltage is higher than both the voltage between the electrode 3 and the auxiliary electrode 8 and the voltage between the auxiliary electrode 8 and the mirror 1. Insulating gaps 5, 6 are preferably of uniform width, such that half the voltage between the electrodes 3, 4 arises at the auxiliary electrode 8. By arranging the auxiliary electrode 8, as set forth above, the auxiliary electrode 8 advantageously has suitable waveguiding properties. The auxiliary electrode 8 illustrated in FIG. 1 is part of the stripline of the stripline laser.

Although various minor modifications may be suggested by those versed in the art, it should be understood that we wish to embody within the scope of the patent granted hereon all such modifications as reasonably and properly come within the scope of our contribution to the art.

We claim:

1. A stripline laser for use with a plasma source, said stripline laser comprising:
   first and second oppositely polarized electrodes with a volume therebetween communicable with said plasma source, said electrodes in combination forming means for placing plasma in said volume at a plasma-maintaining voltage;

an electrically conductive mirror bordering said volume; and first and second insulating paths with at least one conductive path for said plasma therebetween, said first and second insulating paths having a size and orientation for forming, in combination, voltage division means for maintaining a region of said volume adjacent said mirror at a voltage below said plasma-maintaining voltage for preventing formation of deposits on said mirror.

2. A stripline laser as claimed in claim 1, wherein the capacitance of said first and second insulating paths is chosen such that approximately half the voltage between said first and second oppositely polarized electrodes forms at said mirror.

3. A stripline laser as claimed in claim 2, wherein said first and second insulating paths have a uniform width.

4. A stripline laser as claimed in claim 1, further comprising a second mirror directly connected to said first oppositely polarized electrode and an auxiliary electrode disposed in a spacing between said second oppositely polarized electrode and said second mirror, said auxiliary electrode having a voltage potential between the voltage potential of said second mirror and the voltage potential of said second oppositely polarized electrode.

5. A stripline laser as claimed in claim 1, further comprising a plasma-stable layer, wherein said electrically conductive mirror is coated with said plasma-stable layer.

6. A stripline laser comprising:

first and second insulating strips of a defined capacitance;

an electrically conductive mirror; and first and second electrodes separated from said mirror by said insulating strips, where the capacitance of said insulating strips is chosen such that the voltage at said mirror lies at approximately one-half the voltage between said first and second electrodes.

7. A stripline laser comprising:

an electrically conductive mirror adjoining a stripline; and voltage division means for maintaining the voltage of said mirror below a plasma-maintaining voltage.

8. A stripline laser as claimed in claim 7, further comprising first and second electrodes, said voltage division means further comprising first and second insulating gaps, said first and second insulating gaps arranged between said mirror and said first and second electrodes, said first and second insulating gaps having a gap width to achieve voltage division.

9. A stripline laser as claimed in claim 7, further comprising a plasma-stable layer, wherein said mirror is coated with said plasma-stable layer.

10. A stripline laser as claimed in claim 8, further comprising a second mirror, said second mirror directly connected to said first electrode and said second mirror separated from said second electrode by a spacing.

11. A stripline laser as claimed in claim 10, further comprising an auxiliary electrode disposed within said spacing.

12. A stripline laser as claimed in claim 11, wherein the voltage of said auxiliary electrode is greater than the voltage of said second mirror and less than the voltage of said second electrode.

13. A stripline laser as claimed in claim 8, further comprising an insulator disposed in said insulating gaps.

14. A stripline laser as claimed in claim 13, wherein said insulator is a ceramic.

15. A stripline laser as claimed in claim 8, wherein said second electrode is electrically grounded.

16. A stripline laser as claimed in claim 10, wherein said insulating gaps and said spacing are of uniform widths.

17. A stripline laser as claimed in claim 8, wherein said insulating gaps are formed of dielectrics having the same dielectric constant.

* * * * *